(12) United States Patent
Rollin et al.

(10) Patent No.: US 9,191,585 B2
(45) Date of Patent: Nov. 17, 2015

(54) MODULAR NIGHT-VISION SYSTEM WITH FUSED OPTICAL SENSORS

(75) Inventors: Joel Rollin, L'Etrat (FR); Jean-Luc Espie, Mornant (FR)

(73) Assignee: Thales, Courbevoie (FR)

( * ) Notice: Subject to any disclaimer, the term of this patent is extended or adjusted under 35 U.S.C. 154(b) by 345 days.

(21) Appl. No.: 13/813,927

(22) PCT Filed: Jul. 8, 2011

(86) PCT No.: PCT/EP2011/061651
§ 371 (c)(1),
(2), (4) Date: Feb. 1, 2013

(87) PCT Pub. No.: WO2012/016794
PCT Pub. Date: Feb. 9, 2012

(65) Prior Publication Data
US 2013/0128004 A1    May 23, 2013

(30) Foreign Application Priority Data
Aug. 2, 2010  (FR) ...................................... 10 03229

(51) Int. Cl.
*H04N 5/33* (2006.01)
*G02B 23/12* (2006.01)
*G02B 23/18* (2006.01)
*H04N 13/04* (2006.01)
*G02B 23/16* (2006.01)
*G02B 27/01* (2006.01)

(52) U.S. Cl.
CPC .................. *H04N 5/33* (2013.01); *G02B 23/12* (2013.01); *G02B 23/18* (2013.01); *H04N 5/332* (2013.01); *H04N 13/044* (2013.01); *G02B 23/16* (2013.01); *G02B 2027/014* (2013.01); *G02B 2027/0138* (2013.01); *G02B 2027/0154* (2013.01); *G02B 2027/0161* (2013.01)

(58) Field of Classification Search
CPC ........... G02B 27/12; G02B 27/14; H04N 5/33
USPC ............ 250/207, 330; 359/630–639; 345/7–9
See application file for complete search history.

(56) References Cited

U.S. PATENT DOCUMENTS

| | | | |
|---|---|---|---|
| 6,195,206 B1 | 2/2001 | Yona et al. | |
| 6,560,029 B1* | 5/2003 | Dobbie et al. | 359/631 |
| 6,762,884 B2* | 7/2004 | Beystrum et al. | 359/629 |
| 7,211,778 B1* | 5/2007 | Smith et al. | 250/207 |
| 7,345,277 B2* | 3/2008 | Zhang | 250/330 |
| 2002/0030163 A1 | 3/2002 | Zhang | |
| 2007/0084985 A1 | 4/2007 | Smith et al. | |
| 2008/0302966 A1 | 12/2008 | Reed et al. | |

FOREIGN PATENT DOCUMENTS

| | | |
|---|---|---|
| FR | 2863718 A1 | 6/2005 |
| GB | 1569849 | 6/1980 |

* cited by examiner

*Primary Examiner* — Seung C Sohn
(74) *Attorney, Agent, or Firm* — Baker & Hostetler LLP

(57) ABSTRACT

A modular night visualization system with fused optical sensors comprises a light-intensifying base module and an image-sensing auxiliary module. The connections according to the system provide a modular system in which the auxiliary module is easily interchangeable with a different auxiliary module. Thus, a compact and modular visualization system that is operationally easier to use is provided. The system may be a night-vision field-glass for a foot soldier enabling fusion of sensors. Any other application for a vision field-glass with fused sensors is possible.

13 Claims, 5 Drawing Sheets

MODULAR NIGHT-VISION SYSTEM WITH FUSED OPTICAL SENSORS

CROSS-REFERENCE TO RELATED APPLICATIONS

This application is a National Stage of International patent application PCT/EP2011/061651, filed on Jul. 8, 2011, which claims priority to foreign French patent application No. FR 1003229, filed on Aug. 2, 2010, the disclosures of which are incorporated by reference in their entirety.

FIELD OF THE INVENTION

The domain of the invention relates to a modular visualization system allowing the optical fusion of images. The invention relates, for example, to the fusion of intensified images and infrared images.

BACKGROUND

Field-glass-type, night-vision observation visualization systems are frequently used by foot soldiers for night missions. A night-vision field-glass comprises a light-intensifying tube to amplify the residual light of a dimly lit observation scene. This residual light originates from the light of the moon or the light of the stars. Conventional night-vision goggles with light intensification comprise a lens focusing the beams on a photocathode which converts light into electrons, an electronic amplification stage, a phosphor screen and an optical projection system picking up the image formed on the phosphor screen comprising one or two eyepieces. This optical system is possibly folded. The image intensifier or IL conventionally uses a second-generation tube, i.e. comprising an "S20" or "S25" multi-alkali photocathode or a third-generation intensifier with an AsGa or AsGaP photocathode. The responses of the photocathodes cover the visible spectrum with a slight extension towards the near infrared.

The applicant previously filed a French patent application with publication number FR 2 863 718 on Dec. 16, 2003. This application describes a folded optical architecture of a light-intensifying monocular field-glass. Moreover, this document discloses an embodiment with two eyepieces enabling fusion of the intensified image with a video image formed on a screen. Light-intensifying field-glasses intended to be worn directly by a user for night missions are of unit magnification.

A light-intensifying field-glass provides the observer with a faithful perception of natural images. The human eye easily becomes accustomed to images of this type. However one of the disadvantages of field-glasses of this type is the observation of a scene in a condition of very low luminosity, for example inside buildings or during nights with no moon or with an overcast sky. The residual light becomes too weak for the night-vision visualization system to be effective.

To solve this problem, vision field-glasses exist comprising an image sensor sensitive to the temperature of objects. Unlike an IL tube, which performs the function of both image sensing and its display, an infrared detector is merely an image-capturing instrument. The imaging system differs greatly according to the spectral band concerned.

The visible and near infrared bands produce images which originate from the reflection of ambient light on objects, the light source being the sun, moon or stars, etc. The reflectivity of the objects depends greatly on the incident wavelength: Contrast inversions may then occur when the wavelength changes. This property can be exploited to detect objects hidden against a background, by comparing the responses given in different spectral bands.

In the 0.4 µm-2 µm domain, two bands must be taken into consideration. The first region extends approximately from 0.4 µm to 1 µm, which coincides more or less with the sensitivity band of silicon. The SWIR band between 1.3 µm and 2 µm and meaning "Short Wave Infra Red" is the band where the vibration state changes of the OH radical known as "Night Glow" of the high layers of the atmosphere converge. Sensors sensitive in this band are essentially based on InGaAs technologies, although other technologies based on MCT or Ge up to 1.8 µm are also available. These detectors are therefore more effective in overcast weather when the light from the moon or stars is reduced.

Passive imaging based on thermal infrared follows a totally different principle. It detects heat sources. An ambient light background is no longer required. A plurality of spectral bands are possible: Far infrared, known by the name "LWIR" meaning "Long Wave Infra Red", covering the 8-12 µm spectrum and its sub-bands, and medium infrared, known by the name "MWIR" meaning "Medium Wave Infra Red", covering the 3-5 µm band, which mixes actual transmission mechanisms and solar reflection. The MWIR band is suitable above all when very hot sources need to be detected, whereas the LWIR spectrum is intended more for the observation of objects at ambient temperature.

Infrared devices are particularly useful for applications in which hot objects hidden by vegetation need to be detected. However, a thermal image presents a disorienting appearance for the observer, quite different from the rendering of visible or near infrared images.

A second important point must be considered. As previously mentioned, a light-intensifying tube combines two functions in a single component:
  Image sensing and amplification;
  The display of the image on a phosphor screen.

The image formed on the phosphor screen cannot simply be transformed into an electronic video signal. It can only be observed using an optical projection system. In the 0.4-2 µm band, other image-sensing technologies based on CMOS or CCD sensors provide access to a video signal. They cannot perform the second function, i.e. the display function, without an auxiliary module. Compared with light-intensifying tubes, these sensors are generally less sensitive and have a lower resolution and a higher energy consumption. In the infrared band, the image display function requires an auxiliary screen.

Sensor-fusion solutions exist to solve these problems. The American patent application US 2007/0084985 is known from the prior art. This document describes an optical fusion device comprising an intensified channel and an infrared channel visualized on a screen and a camera. It involves a monocular device. The device comprises four channels, an image-sensing channel for the intensified channel and an image-sensing channel for the infrared channel, a display channel for a recording camera, and also for the projection eyepiece. The intensification device can be used with or without the camera module of the display channel in the embodiment with the independent camera module, as described in paragraph 14 of the text of the description. The camera module can then be connected by means of a connector. This device has the disadvantage of being monocular only. Furthermore, it enables fusion only with a predetermined IR camera which is not adaptable according to requirements. This system also consumes energy when the intensified channel and the IR channel are used simultaneously. An energy storage module connected to an electronic system is used by the night-vision device to power all the functional components.

The American patent application US 2008/0302966 is also known from the prior art. This document describes an intensified-channel, night-vision device which can be connected to an IR camera. Any type of IR camera can be used and can easily be connected to the night-vision system by an attachment means using clips. According to this fusion system, two intensified channels are present, and the image of the screen of the IR channel is projected onto a single intensified channel. Consequently, the fused image appears on a single output channel and the night-vision system can be used only in monocular use for a fused view mode.

The patent EP 1857854 is known from the prior art, describing modular-architecture, panoramic, night-time goggles comprising an online light-intensifying optical module, an "HUD" ("Head Up Display") module and a camera module. According to this architecture, a light-intensifying module can be complemented by the HUD module to fuse the intensified images with information from an external system. The function of the camera is to record the images composed of intensified images and information originating from the HUD. These goggles present a modular architecture but do not allow the fusion to be carried out with the intensified channel and the IR channel.

SUMMARY OF THE INVENTION

The object of the invention is to propose a night-vision system enabling the fusion of intensified images and images generated by an IR sensor. The object of the vision system is to provide a modular monocular or binocular system to adapt the IR sensors according to observation conditions. The system must also offer good autonomy of use in both intensified-vision mode and fused-vision mode.

More precisely, the invention is a modular visualization system comprising at least three modules, the first module MDB being an observation device comprising a first mechanical body in which a first channel comprising a display screen, a second image-capturing channel comprising a lens OB1 and at least image-sensing means, a relay optical system and an eyepiece OC1 are arranged, the image of the first channel and the image of the second channel being fused and collimated by the relay optical system and the eyepiece OC1 towards the eye of an observer;

the second module MDAUX being an image-sensing device comprising a second mechanical body in which a lens OB2 and a sensor are arranged to generate a digital image, and;

the third module MDEX being an external device performing at least a power supply function;

the visualization system being such that:

the first module MDB comprises a first data connector C1 associated with a first mechanical coupling means S1;

the second module MDAUX comprises a second data connector C2 associated with a second mechanical coupling means S2 and a third data connector C3 associated with a third mechanical coupling means S3, and;

the third module MDEX comprises a fourth data connector C4 associated with a fourth mechanical coupling means S4;

the connectors C1, C2, C3 and C4 and the mechanical coupling means S1, S2, S3 and S4 are arranged in such a way that the visualization system allows at least the following three configurations:

in a first configuration, the first connector C1 is connected to the fourth connector C4, the first module MDB and the third module MDEX thus being mechanically coupled;

in a second configuration, the first connector C1 and the second connector C2 are coupled to display the digital image of the sensor on the screen and the third connector C3 is coupled to the fourth connector C4, the second module MDAUX thus being mechanically coupled, on the one hand, to the first module MDB and, on the other hand, to the third module MDEX;

in a third configuration, at least the first module MDB functions in stand-alone mode.

Advantageously, the sensing means of the first module MDB are a light-intensifying tube or a detector implemented in "CMOS" or "CCD" or "InGaAs" or "ILCMOS" or "ILCCD" or "EBCMOS" or "EBCCD" technology.

Advantageously, the image display screen of the first module MDB is implemented in "OLED" technology.

Advantageously, the first module MDB comprises:
a means for attachment to a helmet receiving support, or;
a second optical output channel comprising a second eyepiece, the relay optical system transmitting the image from the first and the second optical input channels to each of the output channels, or;
a diaphragm, the aperture of which is controlled at ambient light level, said first module MDB comprising means suitable for setting said diaphragm to the closed position in order to protect the field-glass. Advantageously, the second module MDAUX comprises:
a sensor sensitive to radiation belonging to the visible and near infrared bands, or;
a sensor sensitive to radiation between 1 and 12 μm of the spectral band.

Advantageously, the third module MDEX also performs an image-generating function in order to transmit images, or is a helmet power supply device comprising a means for attachment to a helmet support.

The invention also relates to combat equipment for a foot soldier comprising at least a helmet, a weapon and the modular system as previously defined. In a first variant, the first module MDB and the second module MDAUX are mounted on the helmet. In a second variant, the first module MDB is mounted on the helmet and the second module MDAUX is mounted on the weapon and is used as a sighting component of said weapon.

The night-vision field-glasses for a foot soldier according to the invention can thus be configured with an IR vision module or without an IR vision module in a very simple manner thanks to the arrangement of the different connectors on the observation base module and on the IR module. The use, on the one hand, of a base module performing the optical and electronic functions for the fusion of the images, and, on the other hand, of an auxiliary module performing the IR image-sensing functions allows the visualization system to be adapted according to operational requirements. This allows the sensitivity of the IR vision module to be adapted very quickly according to observation conditions by modifying the IR vision module only. This modularity also allows a troop of foot soldiers to equip themselves with a first batch of observation goggles and a second reduced batch of IR cameras which they can exchange with one another. The first advantage of this modularity is a reduction in the overall cost of the equipment of a combat section. A second advantage is the reduction in the weight and the power consumption of the equipment when the IR module is not necessary.

BRIEF DESCRIPTION OF THE DRAWINGS

The invention will be more readily understood and other advantages will become evident from reading the non-limiting description which follows, referring also to the attached drawings, in which.

Figure 5:
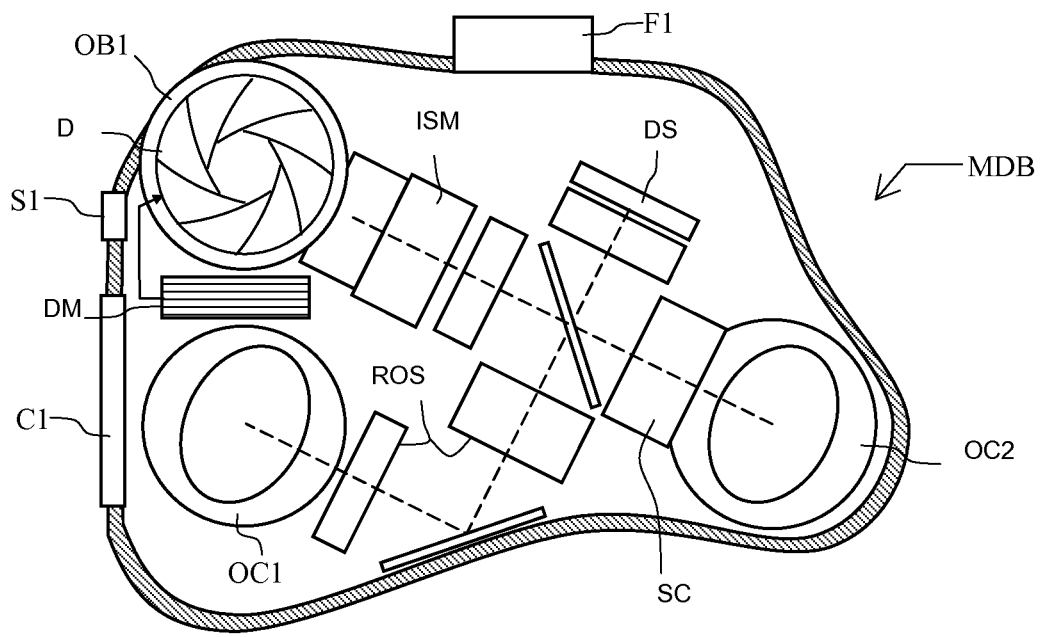
FIG. 5 illustrates a sectional view of the first module.

More precisely, the invention is a modular visualization system comprising at least three modules, the first module MDB being an observation device comprising a first mechanical body in which a first channel comprising a display screen DS, a second image-capturing channel comprising a lens OB1 and at least image-sensing means ISM, shown in FIG. 5, a relay optical system ROS and an eyepiece OC1 are arranged, the image of the first channel and the image of the second channel being fused and collimated by the relay optical system and the eyepiece OC1 towards the eye of an observer;

the second module MDAUX being an image-sensing device comprising a second mechanical body in which a lens OB2 and a sensor are arranged to generate a digital image, and;

the third module MDEX being an external device performing at least a power supply function;

the visualization system being such that:

the first module MDB comprises a first data connector C1 associated with a first mechanical coupling means S1;

the second module MDAUX comprises a second data connector C2 associated with a second mechanical coupling means S2 and a third data connector C3 associated with a third mechanical coupling means S3, and;

the third module MDEX comprises a fourth data connector C4 associated with a fourth mechanical coupling means S4;

the connectors C1, C2, C3 and C4 and the mechanical coupling means S1, S2, S3 and S4 are arranged in such a way that the visualization system allows at least the following three configurations:

in a first configuration, the first connector C1 is connected to the fourth connector C4, the first module MDB and the third module MDEX thus being mechanically coupled;

in a second configuration, the first connector C1 and the second connector C2 are coupled to display the digital image of the sensor on the screen and the third connector C3 is coupled to the fourth connector C4, the second module MDAUX thus being mechanically coupled, on the one hand, to the first module MDB and, on the other hand, to the third module MDEX;

in a third configuration, at least the first module MDB functions in stand-alone mode.

Figure 7:
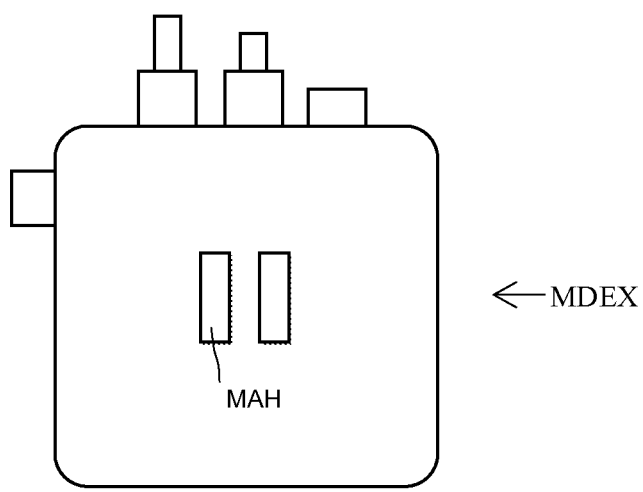
FIG. 7 illustrates a rear view of the third module.

Advantageously, the first module MDB comprises:

a means for attachment (MAH), shown in FIG. 7, to a helmet receiving support F1, or;

a second optical output channel comprising a second eyepiece, the relay optical system transmitting the image from the first and the second optical input channels to each of the output channels, or;

a diaphragm, the aperture of which is controlled at ambient light level, said first module MDB comprising means suitable for setting said diaphragm to the closed position in order to protect the field-glass.

Advantageously, the second module MDAUX comprises:

a sensor sensitive to radiation belonging to the visible and near infrared bands, or;

a sensor sensitive to radiation between 1 and 12 µm of the spectral band.

DETAILED DESCRIPTION

Figure 4:
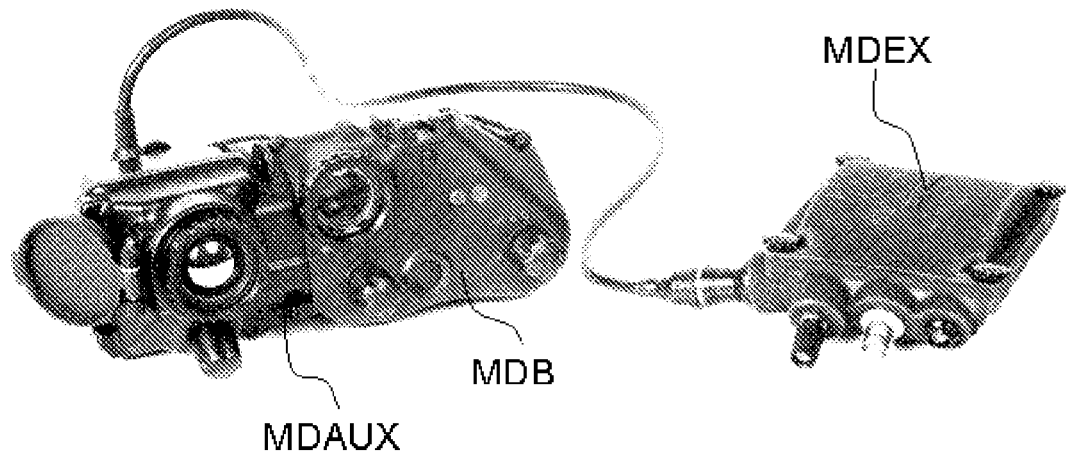
FIG. 4 shows the base module, the auxiliary module and the external power supply module coupled together.
Figure 6:
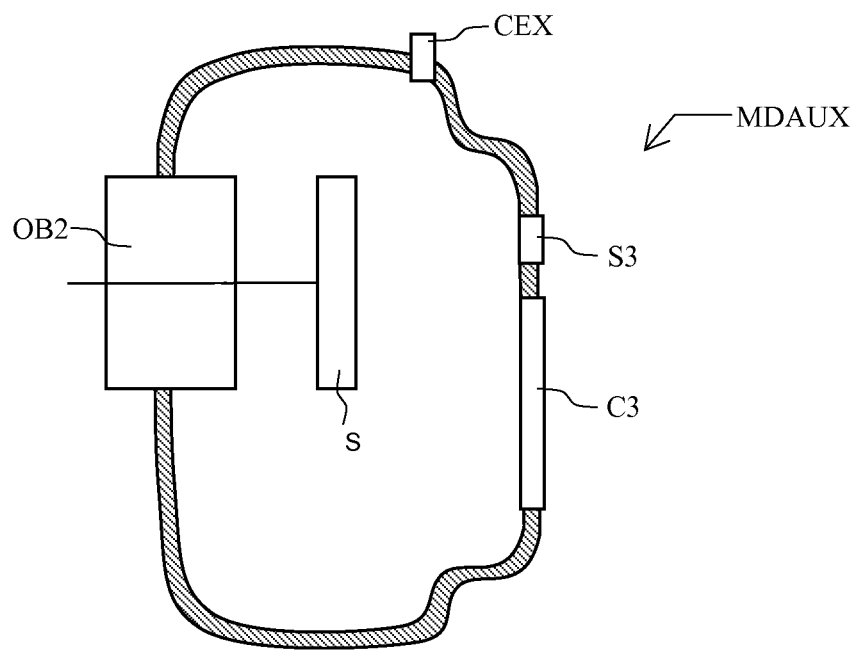
FIG. 6 illustrates a sectional view of the second module.

As shown in FIGS. 4 and 6, a night-vision visualization system according to the invention comprises a base module MDB, an auxiliary module MDAUX with an IR sensor (S) and an external power supply module MDEX. These modules enable the configuration of a night visualization system with optical fusion of intensified images and infrared images. The external power supply module MDEX can be adapted according to energy requirements. The auxiliary module MDAUX used can be adapted in such a way as to comprise an IR sensor S sensitive in the required spectral bands. For example, a group of foot soldiers may have a plurality of auxiliary modules MDAUX which can be used on the same base module MDB, each one being sensitive in a specific spectral band. The sensitivity band of the auxiliary module MDAUX is preferably complementary or partially overlaps the sensitivity band of the light-intensifying module MDB.

The external power supply module MDEX performs the power supply function for the electronic components of the base module MDB and also the auxiliary module MDAUX when this power supply module is coupled with the auxiliary module MDAUX. The external power supply module may be a system performing the power supply function but also other functions, such as, for example, the transmission of images originating from a graphical generation unit. These images may originate from a computing system processing a variety of information useful to the observer, for example location, orientation assistance, target-detection information, etc.

Figure 1:
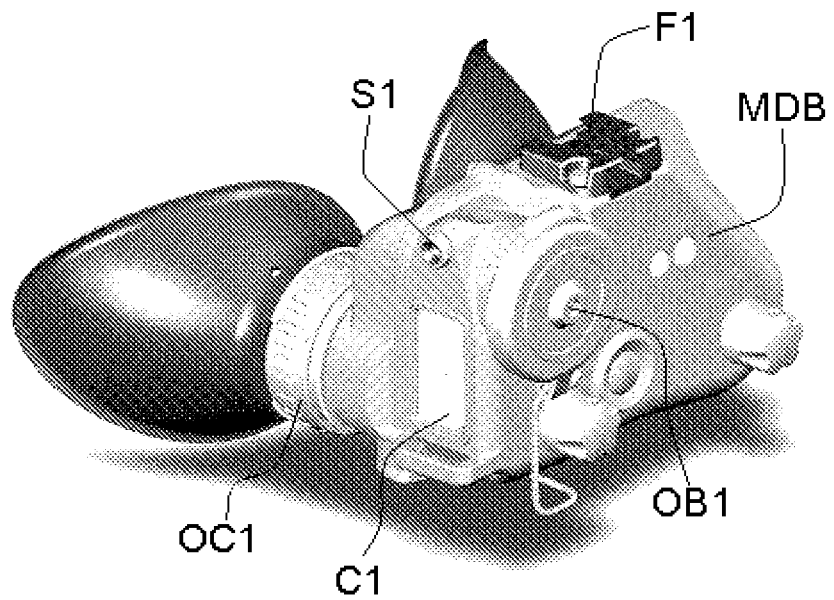
FIG. 1 shows an embodiment of the base module of the display system also comprising the light-intensifying optical system.

FIG. 1 shows a non-limiting embodiment of the base module MDB. Its shape and dimensions may differ.

The base module MDB comprises, on a first channel, a lens OB1 and a device for intensifying the light within the mechanical body and not shown in FIG. 1. This lens OB1 comprises a protective cap in FIG. 1. The sensing means of the first module MDB can also be a detector implemented in "CMOS" or "CCD" or "InGaAs" or "ILCMOS" or "ILCCD" or "EBCMOS" or "EBCCD" technology.

It also comprises a second channel (SC), shown also in FIG. 5, transporting the image to be fused with the image of the lens OB1. This second image-sensing channel implements a display screen on which the image of the auxiliary module (MDAUX) is displayed. The elements of the second channel and the screen are also inside the mechanical body and are not therefore shown in FIG. 1. These elements do not pose any particular implementation problems for the person skilled in the art.

The display screen (DS), shown in FIG. 5, is preferably an OLED ("Organic Light-Emitting Diode") photoemissive screen, but may be of any other type. A reduced-size flat screen is preferably used.

The mechanical body comprises a relay optical system (ROS), shown in FIG. 5, to transport the images from the first image-sensing channel and the second image-sensing channel (SC) to the eyepieces OC1. The second function of this relay optical system (ROS), shown in FIG. 5, is the fusion of the image of the first image-sensing channel and the image of the second image-sensing channel (SC). A semi-reflective strip can be used to fuse, through reflection and transmission, light beams originating from the two input channels. Other optical devices known to the person skilled in the art, such as separator cubes, can be used to carry out the fusion and the transport of the images to the eyepieces OC1.

The base module MDB shown in FIG. 1 comprises two eyepieces OC1 and OC2 (shown in FIG. 5). An optical architecture of this type capable of transporting the images from two image-capturing channels to one or two eyepieces OC1 and OC2 with fusion of the images does not pose any particular technical problems to the person skilled in the art. Reference can be made on this subject to the French patent application with publication number FR 2863718 of the applicant which describes an optical architecture with one or two eyepieces comprising an image-sensing channel with a lens and a display channel with a screen.

The base module MDB may comprise a diaphragm (D), shown in FIG. 5, the aperture of which is controlled at ambient light level, in which case the module MDB comprises means (DM) suitable for setting said diaphragm D to the closed position in order to protect the first module MDB.

According to one essential characteristic of the invention, the mechanical body of the base module MDB comprises a first electronic connector C1 and a mechanical coupling means S1. The connector C1 can be connected to an external device, its first function being the transmission of digital data from a video stream to the display screen of one of the image-sensing channels. The internal electronic means comprise data buses, electronic cards, electronic data bus control components and any other electronic means necessary to transmit to the screen video data to be displayed.

The connector S1 also serves to provide the power supply of the electronic components. An internal power supply circuit receives the power supply signals according to a voltage level adapted to the internal electronic circuits.

The mechanical coupling means S1 is associated with the electronic connector C1 in such a way as to mechanically couple the connector of an external device coupled to the connector C1 of the base module, the connector of the external device also being associated with a coupling means compatible with the mechanical coupling means S1. Thus, the coupling means S1 joins together the base module and the external module connector. The connector C1 is integrated into the surface of the mechanical body of the base module MDB.

Figure 2:
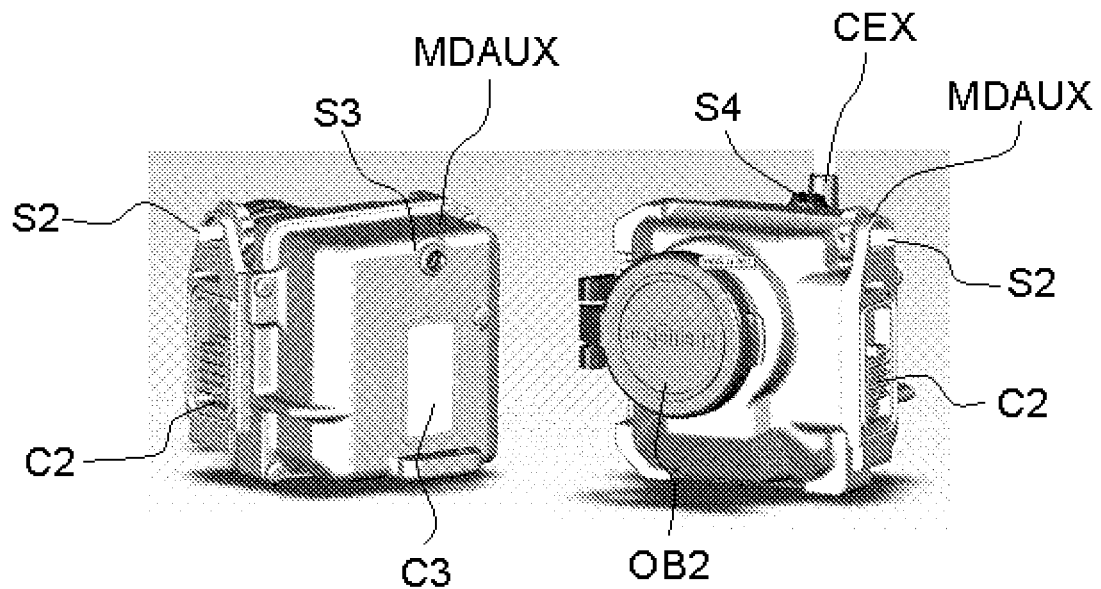
FIG. 2 shows an embodiment of the auxiliary module of the visualization system comprising the IR sensor.

FIG. 2 shows a non-limiting embodiment of an auxiliary module MDAUX according to two angles of view. The first angle of view on the left part of FIG. 2 allows the rear surface and a side surface of the auxiliary module to be visualized. In this view, the auxiliary module is not coupled with an external connector. The second angle of view is a front view of the auxiliary module and the latter is connected to an external connector CEX.

The auxiliary module MDAUX comprises an image sensor allowing video images crossing a lens OB2 to be recorded. This lens comprises a protection cap in FIG. 2. The sensor is preferably sensitive in a spectral band of the infrared domain, the aim being to fuse the images produced by the sensor with the images generated by the base module MDB. The auxiliary module comprises the electronic means for transmitting the video data to a connector C2 mounted on the surface of the mechanical body of the auxiliary module. These electronic means notably comprise a computer to control the data buses, the power supply circuits being fed by at least one connector of the auxiliary module.

According to one embodiment of the auxiliary module MDAUX, a first connector C2 is present on the side surface and a second connector C3, shown in FIG. 6, is present on the rear surface. The arrangement of the connectors C2 and C3 is configured in such a way that it is possible to couple simultaneously the connectors C2 and C3 with connectors of external devices. The connectors C2 and C3 are associated with mechanical coupling means S2 and S3 respectively. The shapes of the mechanical coupling means S2 and S3 are compatible.

Figure 3:
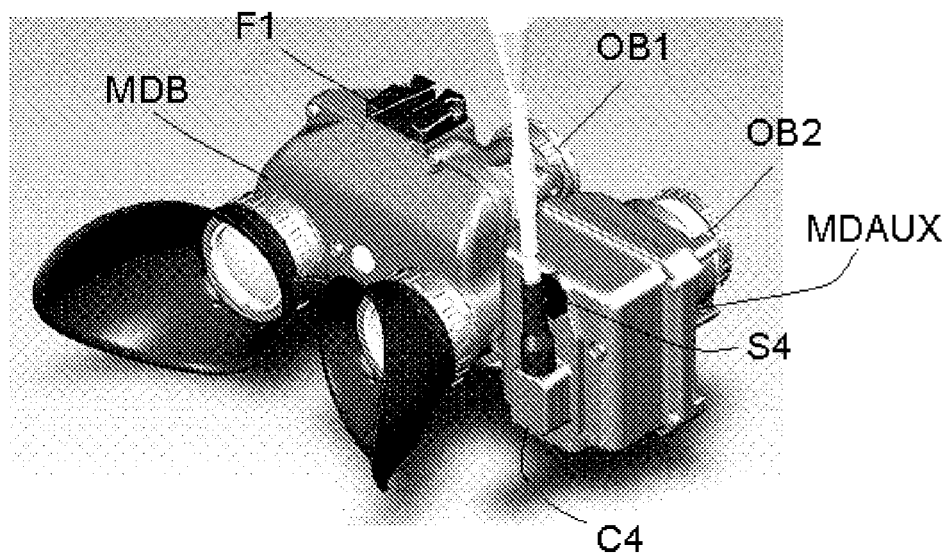
FIG. 3 shows the base module and the auxiliary module coupled together for an optical-fusion use, the connector of the external power supply module being connected to the auxiliary module.

The connector C2 and the mechanical coupling means of the auxiliary module MDAUX can be connected to the connector C1 of the base module MDB. FIG. 3 shows the configuration of the night-vision system when these two modules MDB and MDAUX are connected and mechanically coupled. The connector C1 of the observation device MDB positioned on a side surface, the left surface looking at the device from the side of the lens OB1, is coupled with the connector C2 of the infrared image-sensing device MDAUX positioned on the right surface looking at the device IR from the side of the lens OB2.

The connector C3 of the image-sensing device is connected to a connector C4 of an external module serving as a power supply and possibly being able to perform some control and image-sensing functions. The external module is then a more complete system than a simple power supply module. The connectors C1 and C2 are mechanically coupled by the coupling means S1 and S2. These coupling means are, for example, a threaded hole for the coupling means S1 and a fixing screw for the coupling means S2. The connectors C3 and C4 are mechanically coupled by the coupling means S3 and S4. These coupling means are, for example, a threaded hole for the coupling means S3 and a fixing screw for the coupling means S4. The person skilled in the art knows how to design any type of coupling means to provide the coupling between two connectors.

This configuration of the visualization system allows the system to be used according to three operating modes. In a first operating mode, only the night vision of the modular visualization system is used. The eye of the observer sees only the images originating from the intensifier tube.

In a second operating mode, the night vision is complemented with images displayed on the accompanying screen, optically fusing these images with those of the intensified channel formed on the phosphor screen of the intensifier tube. The image displayed on the auxiliary screen originates from the video stream transmitted by the connector C1 of the base module MDB.

In a third operating mode, the night vision is not activated and the visualization system is used in remote-vision mode. The eye of the observer then sees images originating from the IR auxiliary module.

The different modes are activated and controlled using control buttons placed on the front of the field-glass, with the following controls:

On/Off and intensifier tube gain control, and;
On/Off and video screen luminosity control.

The invention is clearly not limited to this type of controls and other control interfaces can be proposed. A simple interface adapted to a military use is preferred.

The modes can also be activated by the system by sending the corresponding controls via the communication interface of the connector C1. In this case, the controls located on the field-glass remain active.

The image of the intensifier tube, such as the screen image, are visible in both eyepieces. The OLED screen image is visible, either alone if the intensifier is switched off, or superimposed on the image provided by the intensifier when the latter is switched on.

A supplementary source emitting a light at a wavelength to which the intensifier is sensitive provides the lighting, if necessary, in the field of vision to enable operation at a short distance in an extremely dark environment. Map reading, handling operations, movements, for example, are thus facilitated.

In one embodiment, a photodiode located on the front of the field-glass enables the automatic shut-off of the intensifier in the event of prolonged excessive lighting in order to protect the tube. In a different embodiment, the observation device MDB comprises a diaphragm D, the aperture of which is controlled at ambient light level, said observation device MDB comprising means suitable for setting said diaphragm D to the closed position in order to protect the first module MDB in cases where the ambient light is too intense.

FIG. 4 shows the night-vision visualization system configured with a base module connected by the connector C1 to an auxiliary module on its connector C2 which is connected by its connector C3 to a specific power supply module. This power supply module is adapted according to the energy requirements of the auxiliary module. Moreover, it offers the advantage of providing a greater autonomy than a system powered by a power supply module integrated into the system, i.e. a battery module. An integrated battery system of this type is not ideal for a modular visualization system.

Any type of auxiliary sensor module comprising a connector compatible with the connector C1 of the auxiliary module can be used. The connector C2 of the auxiliary module and the connector C4 of the power supply module or of a system module are similar. This arrangement provides a modularity allowing the night visualization system to be used with or without an auxiliary module, with optical fusion activated or not. The connector interface and the simple mechanical coupling means simplify the change from a first configuration to a second configuration. Another advantage is the possibility to equip a group of foot soldiers without the need for each foot soldier to have his own IR sensor module. Each foot soldier has an intensifier-tube observation device, whereas a batch of IR sensor modules can be shared within the troop, thereby reducing the equipment cost.

Figure 8:
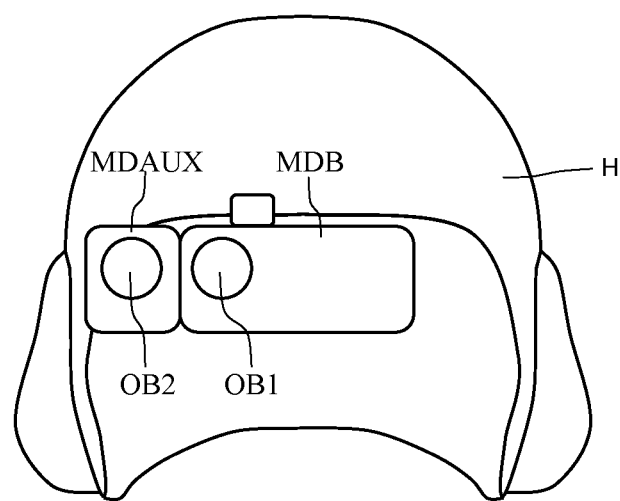
FIG. 8 illustrates a helmet with the first module and the second module.
Figure 9:
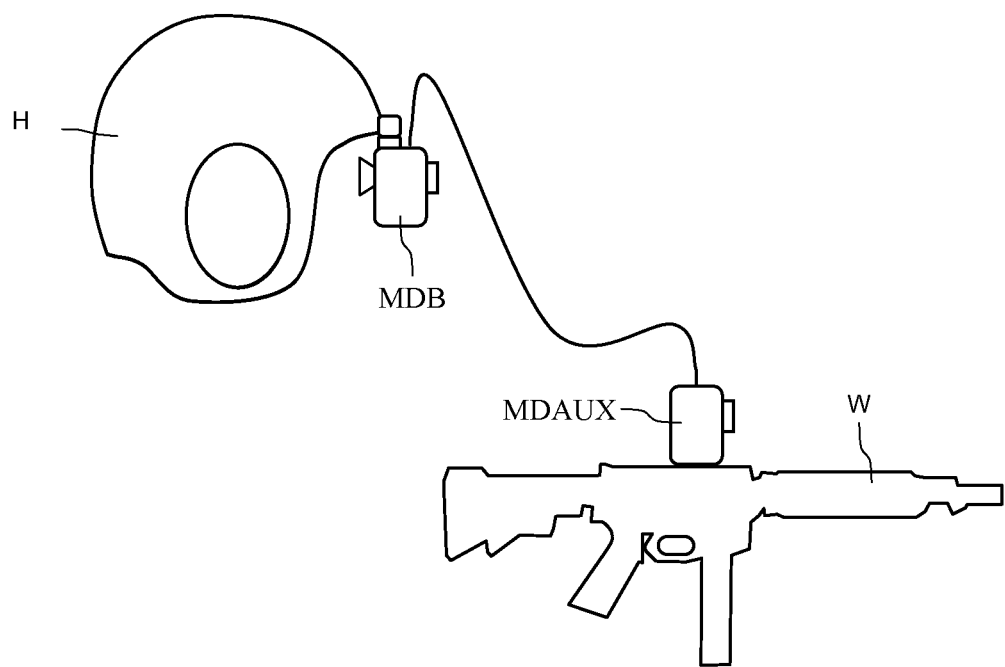
FIG. 9 illustrates a combat equipment with the first module and the second module.

A base module MDB can be used at night in a "hands-free" application. In this case, they can be attached to a helmet H, shown in FIGS. 8 and 9, via an adjustable helmet receiving support F1 as shown in FIG. 1 and FIG. 5. This support may differ according to applications. It allows the base modules to be hooked onto the helmet H of the foot soldier and ensures the positioning of the field-glass in front of the eyes and its retraction to allow direct vision.

The base modules allow a plurality of possible modes of use. In a first mode, the night visualization system is connected to an equipment network. In a second mode, the system is in a stand-alone configuration connected to a power supply device which can be hooked directly onto the carrier, on a helmet or belt. In a third mode, the visualization system comprises an auxiliary module and a base module enabling image fusion, a mode in which an image provided by a different sensor forming on the screen of the base module is superimposed on the intensified image.

The invention is also applied to night-vision field-glasses enabling optical fusion. It preferably applies to light-intensifying field-glasses for foot soldiers. Thus, combat equipment for foot soldiers may comprise at least a helmet, a weapon W, shown in FIG. 9, and the modular system according to the invention. In a first variant, the first module MDB and the second module MDAUX are mounted on the helmet H of the foot soldier. In a second variant, the first module MDB is mounted on the helmet H and the second module MDAUX is mounted on the weapon W and is used as a sighting component of said weapon W, the foot soldier thus being able to sight without needing to break cover, by day and by night.

However, other applications of the modular system according to the invention for the general public domain or other military applications are possible.

The invention claimed is:

1. A modular visualization system comprising at least three modules, comprising:
    a first module being an observation device comprising a first mechanical body in which a first channel comprising a display screen, an image-capturing channel comprising a lens and at least image-sensing means, a relay optical system and an eyepiece are arranged, the image of the first channel and the image of a second channel being fused and collimated by the relay optical system and the eyepiece towards the eye of an observer;
    a second module being an image-sensing device comprising a second mechanical body in which a lens (OB2) and a sensor are arranged to generate a digital image, and;
    a third module being an external device performing at least a power supply function;
    wherein the first module comprises a first data connector suitable for transmitting a video stream and providing the power supply for the components of the first module and associated with a first mechanical coupling means;
    wherein the second module comprises a second data connector suitable for transmitting a video stream and a power supply signal and associated with a second mechanical coupling means, and a third data connector suitable for providing the power supply for the components of the first and the second module and associated with a third mechanical coupling means;
    wherein the third module comprises a fourth data connector associated with a fourth mechanical coupling means;
    wherein the data connectors and the mechanical coupling means are arranged in such a way that the visualization system allows at least the following three configurations:
        in a first configuration, the first connector is connected to the fourth connector, the first module and the third module thus being mechanically coupled by the first and fourth mechanical coupling means;
        in a second configuration, the first connector and the second connector are coupled to display the digital image of the sensor on the display screen and the third connector is coupled to the fourth connector, the second module being mechanically coupled, on the one hand, to the first module by the first and the second mechanical coupling means and, on the other hand, to the third module by the third and the fourth mechanical coupling means;
        in a third configuration, at least the first module functions in stand-alone mode.

2. The modular visualization system as claimed in claim 1, wherein the image-sensing means of the first module are a light-intensifying tube.

3. The modular visualization system as claimed in claim 1, wherein the image-sensing means of the first module is a detector implemented in "CMOS" or "CCD" or "InGaAs" or "ILCMOS" or "ILCCD" or "EBCMOS" or "EBCCD" technology.

4. The modular visualization system as claimed in claim 1, wherein the display screen of the first module is implemented in "OLED" technology.

5. The modular visualization system as claimed in claim 1, wherein the first module comprises a means for attachment to a helmet receiving support.

6. The modular visualization system as claimed in claim 1, wherein the first module comprises the second channel comprising a second eyepiece, the relay optical system transmitting the image from the first channel and the image-capturing channel to the first channel and the second channel.

7. The modular visualization system as claimed in claim 1, wherein the first module comprises a diaphragm, the aperture of which is controlled at ambient light level, said first module comprising means suitable for setting said diaphragm to the closed position in order to protect the field module.

8. The modular visualization system as claimed in claim 1, wherein the second module comprises a sensor sensitive to radiation belonging to the visible and near infrared bands.

9. The modular visualization system as claimed in claim 1, wherein the second module comprises a sensor sensitive to radiation between 1 and 12 µm of the spectral band.

10. The modular visualization system as claimed in claim 1, wherein the third module also performs an image-generating function in order to transmit images.

11. The modular visualization system as claimed in claim 1, wherein the third module is a helmet power supply device comprising a means for attachment to a helmet support.

12. A combat equipment for a foot soldier comprising at least a helmet, a weapon and a modular system as claimed in claim 1, wherein the first module and the second module are mounted on the helmet.

13. A combat equipment for a foot soldier comprising at least a helmet, a weapon and a modular system as claimed in claim 1, wherein the first module is mounted on the helmet and the second module is mounted on the weapon and is used as a sighting component of said weapon.

* * * * *